United States Patent Office 3,780,158
Patented Dec. 18, 1973

3,780,158
PROCESS FOR RECOVERING HIGH PURITY FREE FLOWING CRYSTALLINE MANGANESE DIOXIDE FROM IMPURE MANGANESE NITRATE SOLUTIONS
Jay Y. Welsh, Catonsville, Md., assignor to Diamond Shamrock Corporation, Cleveland, Ohio
No Drawing. Filed June 23, 1972, Ser. No. 265,589
Int. Cl. C01g 45/02, 45/08
U.S. Cl. 423—49
10 Claims

ABSTRACT OF THE DISCLOSURE

High purity, uniformly free flowing, pyrolusite crystals of manganese dioxide are obtained from crude impure manganese nitrate solution by adjusting the pH, heating and filtering the solution to remove precipitates. The treated solution is then combined with pure manganese dioxide to form a slurry which is vigorously agitated and heated at a rate of heat input controlled to decompose the manganese nitrate and provide high purity free flowing pyrolusite crystals of manganese dioxide, nitrogen dioxide and water vapor.

BACKGROUND OF THE INVENTION

(1) Field of the invention

This invention relates generally to a process for recovering high purity free flowing pyrolusite crystals of manganese dioxide from impure manganese nitrate solutions.

(2) Discussion of the prior art

A satisfactory process to upgrade abundant low grade oxidized manganese-containing ores to recover manganese dioxide has been investigated for many years. Several investigators have attempted to develop processes based partially or in toto on the chemistry of the following chemical equation:

$$M_n(NO_3)_2 \underset{}{\overset{H_2O}{\rightleftharpoons}} M_nO_2 + 2NO_2$$

The reversible nature of the illustrated reaction which provides a basis for a practical batch, or particularly cyclic, process was the incentive for the early development work. It will be observed that one of the critical steps in this process is the decomposition of manganese nitrate solution, for which a practical and economic process is provided by the present invention. Failure of the prior investigators to recognize the precise conditions required to optimize the chemistry at critical steps in the process prevented the development of a successful practical batch or cyclic process based on the reaction shown. The chemistry of the process, in its simplest form, is shown in the following diagram.

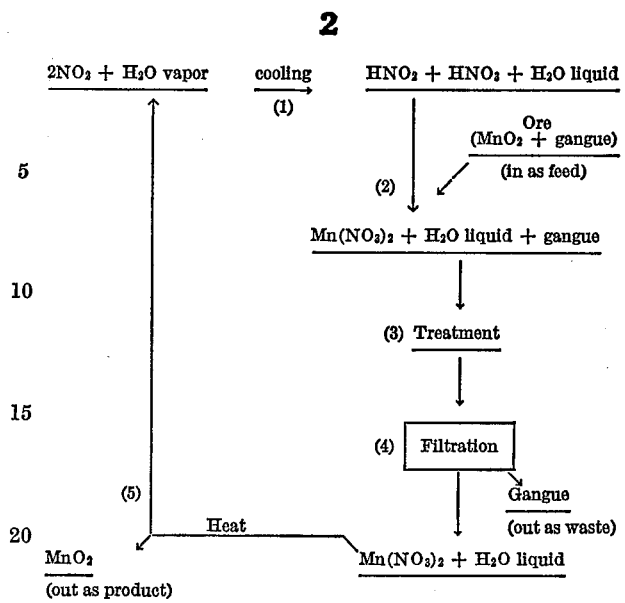

As indicated by the diagram, the process is in theory completely cyclic. Manganese nitrate solution is decomposed by heat to produce a pure $MnO_2$ product and $NO_2$ gas. The $NO_2$ gas along with associated water vapor is condensed under conditions which bring about the formation of nitrous and nitric acids. These in turn react with the $MnO_2$ in crude manganese ore to regenerate manganese nitrate solution. The regenerated solution is separated from the impurities associated with the crude ore by pH adjustment and filtration and then fed to the decomposition unit to repeat the cycle.

The term impure manganese nitrate solution wherever it appears in this specification and claims means manganese nitrate solutions containing soluble impurities and slurries containing manganese nitrate solution and both soluble and insoluble impurities.

Information concerning the treatment of manganese nitrate solution for the removal of impurities derived from the ore from which it was generated is limited in the literature, especially as such treatment applies to the preparation of a solution for subsequent decomposition treatment. In all the prior art patents pertaining to the decomposition of manganese nitrate as a means of generating an upgraded form of manganese dioxide of which the inventor is aware, the decomposition is carried out under extreme temperature conditions to give a massive and relatively impure product.

Laury in U.S. 1,751,133 and Koslov in U.S. 2,779,659 imply or indicate a step in which gangue is removed from regenerated manganese nitrate solution, with no teaching of pH adjustment. Fox et al. in a report published by the Department of the Interior, Bureau of Mines in 1945, Technical Paper No. 674, indicate a separation of solids after a partial neutralization of excess nitric acid by calcium oxide. No specific procedure or pH is disclosed. In U.S. 2,737,441 to Nossen a leaching procedure in which the pH is adjusted to a value of 3.0 before solid separation is shown. There is no indication in any of these references of a recognition of a relationship between the impurities present in the manganese nitrate solution and the type of decomposition product which can be produced or that certain critical parameters are required during decomposition to obtain a high purity crystalline manganese dioxide product of pyrolusite structure.

The decomposition of manganese nitrate by heat to produce manganese dioxide is well known and methods of accomplishing the decomposition have been described in a number of patents. U.S. Pat. No. 1,287,041 to Kaplan teaches a batch process for decomposition of manganese nitrate in which a hard massive block of manganese dioxide difficult to "pulverize" was formed. Kaplan's inventive contribution was the provision of a method of adding an alkali nitrate to the manganese nitrate solution prior to decomposition to cause the block of manganese dioxide product to break down when boiled with water. The purity and physical characteristics of the final product are not described. Laury, in U.S. Pat. 1,761,133 describes the decomposition of a preconcentrated "solid" manganese nitrate to manganese dioxide in the range of 120–200° C. He mentions agitation but does not state whether the process is batch or continuous. He does not indicate the physical form of the product or method of heating. The disclosure of the patent is questionable since he stated he produced solid manganese nitrate, $Mn(NO_3)_2$ by boiling down neutral solution to a separation of solid manganous nitrate, an impossibility. The known solid forms of manganese nitrate contain several mols of water, e.g., ($Mn(NO_3)_2 \cdot 6H_2O$, M.P. 25.8° C. and $$Mn(NO_3)_2 \cdot 3H_2O$$

M.P. 35.5° C. No anhydrous forms are known to exist in neutral solution and the known solid compositions can be formed only by cooling and not in the boildown process. Fox et al. U.S. Pat. 2,374,674 describes attempts to decompose manganese nitrate solution by indirect heating. This approach was concluded to be impractical because of excessive scaling on the heat exchange surfaces leading to poor heat transfer. Also excessive foaming was encountered. Fox et al. claim a method of heating in which the decomposition products, HO and $NO_2$ are recycled through a high temperature heat exchanger and brought back over a shallow pool of manganese nitrate solution. In this way the heat transfer is effected at the surface and the above difficulties are partially avoided. It is to be noted however, that a more detailed discussion of this approach in the above mentioned Bureau of Mines Report (Technical Paper 674) mentions scaling within the decomposition vessel and on the rakes employed to remove the product. This type of operation appears to be commercially impractical. Koslov, U.S. Pat. 2,779,659 teaches a process for decomposing manganese nitrate solution under pressure in the presence of oxygen with the aim of directly converting the $NO_2$ to nitric acid. It is apparent that this process is batch and would lead to the formation of manganese dioxide in the form of massive shapes. Nossen, in U.S. Pat. 2,681,268 describes the decomposition of manganese nitrate solution in a spray dryer. He employed 300 gm./l. manganese nitrate feed solution and spray dryer temperatures of 200–300° C. Air was intentionally employed as the gas media in order to oxidize the $NO_2$ formed to nitric acid. The problem of reclaiming the nitric acid from the relatively large volume of air and the type of manganese dioxide product obtained was not discussed. In another U.S. Pat. 2,737,441 Nossen describes the decomposition of manganese nitrate solution on a hot drum in the presence of an excess air sweep. The layer of manganese dioxide formed on the drum is flaked off with a doctor blade in the usual manner and is not in the form of high purity pyrolusite crystals.

Although the instant invention deals with specific features of the decomposition of manganese nitrate solution, is important to point out that differences in the overall ore beneficiation process must be taken into account when discussing the relevance of the earlier patents. Only Kaplan and Fox similarly employ $NO_2$ directly as the leaching agent to regenerate manganese nitrate solution from the raw ore feed. Nossen, Loury and Koslov all endeavor to convert the $NO_2$ formed by decomposition of manganese nitrate into nitric acid by a direct oxidation step, generally involving an excess of air. With this approach three separate processing steps are involved in the leaching of the ore instead of one, rendering the overall process much less efficient and more costly. The steps are:

(1) $NO_2$ is oxidized to nitric acid by oxygen in the presence of water.

(2) Raw ore is reduced in some type of calcining-reduction step from its normal $MnO_2$ level to MnO, or some intermediate lower oxide.

(3) The reduced ore is then leached with the nitric acid to regenerate manganese nitrate solution.

In the process of this invention the decomposition of the manganese nitrate solution is controlled in such manner that:

(a) The $MnO_2$ product is composed of free flowing pure pyrolusite crystals of reagent quality, within a size range from about 300 mesh to about 60 mesh with about 80 percent of the particles between 200 mesh and 80 mesh.

(b) No scale, flakes or lumps of decomposition product are produced.

(c) Soluble impurities from the ore are conveniently removed with a mother liquor bleed-out.

(d) The decomposition gases are removed without danger of leaks or air contamination to the leaching circuit.

(e) The decomposition is continuous and very efficient with respect to material losses as well as heat conservation.

(f) The equipment is simple, conventional and virtually maintenance free.

By comparison, the methods of decomposition described by both Fox and Nossen suffer from very serious drawbacks. The decomposition processes described by Kaplan, Koslov and Laury are so vague and ill-defined as to be meaningless. Fox et al. define, in part, problems which must be eliminated to bring about a practical process, i.e., scale formation on heat exchange surfaces, foaming and impurity buildup. In an attempt to circumvent these problems Fox et al. devised a mechanical system requiring very high maintenance and at the same time a system very difficult to seal against loss of $NO_2$. A particularly serious disadvantage was their failure to eliminate caking and scaling. They only succeeded in preventing the scaling from interfering with the required heat transfer. Nossen instead of eliminating undesirable scale simply turned it to his advantage by causing scaling to occur on a heated drum or belt. The scale, or product, was then flaked from the hot surface by means of a doctor blade. This system also requires high maintenance, especially since the manganese dioxide scale is quite abrasive. The system is also difficult to seal against the access of air or the loss of $NO_2$. Nossen of course wanted excess air and therefore swept air into and through the decomposition and flaking unit.

It is important to point out that Fox and especially Nossen prepare the manganese dioxide product under extreme nonequilibrium conditions which cause the inclusion of impurities in the product structure. In addition, the necessity of milling or crushing the products produced by both Fox and Nossen will produce a material containing a broad particle size range including a high percentage of fines which material is difficult to wash and handle.

SUMMARY OF THE INVENTION

It is an object of this invention to provide a process for treating a crude aqueous manganese nitrate solution to remove impurities and decomposing the treated solution to provide high purity free flowing pyrolusite crystals of manganese dioxide.

A further object of this invention is the provision of a process for treating a crude aqueous manganese nitrate solution to precipitate and remove impurities by filtration and heating the filtrate to decompose the solution at a rate controlled to provide high purity free flowing manganese dioxide crystals of pyrolusite structure.

DESCRIPTION OF THE PREFERRED EMBODIMENTS

In accordance with these objects the process of this invention comprises:

Adjusting the pH of a crude or impure manganese nitrate solution to from about 4.0 to about 5.5;

Heating the adjusted solution at a temperature from about 70° C. to about 105° C. and filtering the solution;

Combining the filtrate with substantially pure manganese dioxide to form a slurry;

Vigorously agitating and heating the slurry at a rate of heat input controlled to decompose the manganese nitrate and provide high purity free flowing pyrolusite crystals of manganese dioxide, nitric oxide and water vapor and, Recovering the manganese dioxide product.

The process may be carried out continuously by continuously adding manganese nitrate solution, previously treated, by adjusting the pH, heating and filtering as above described to a slurry prepared initially by combining a manganese nitrate soltuion, treated as above-described, with substantially pure manganese dioxide, continuously agitating and heating the slurry to decompose the manganese nitrate whereby high purity free flowing pyrolusite crystals of manganese dioxide, nitric oxide and water vapor are produced, and recovering the manganese dioxide product.

In order to produce a high purity, crystalline product in particulate form it has been found essential to remove certain acid soluble impurities which interfere with the crystal growth of the $MnO_2$.

It has been determined that aluminum is one of the common impurities present in manganese ore which can be solubilized in the leaching step and if not adequately removed by proper treatment can prevent the growth of well defined manganese dioxide crystals in the subsequent decomposition of the manganese nitrate solution. The effect of aluminum contamination on the decomposition step in an agitated system can be summarized as follows:

The maximum level of aluminum solubility which can be permitted in the manganese nitrate solution is about 600 p.p.m and for practical operation the level should be maintained below 200 p.p.m. It has been found that the pH of the regenerated manganese nitrate solution must be adjusted to a value from about 4.0 to about 5.5 in order to adequately control the amount of soluble aluminum. Preferably the pH is adjusted from about 4.5 to about 5.0 to substantially remove aluminum impurities.

Since the aluminum and other impurities contained in the regenerated manganese nitrate solution must be removed as solids by filtration it is essential that colloidal type precipitates such as aluminum hydroxide and ferric hydroxide are in a suitable physical form. It has been found that heat as well as pH adjustment is essential to prepare the leach slurry for filtration. The purpose of the heat is to flocculate the colloidal type of precipitates obtained. A temperature range of from about 70° C. to about 105° C. is satisfactory and a temperature from about 90° C. to about 100° C. is preferred in combination with the specified pH for satisfactory removal of impurities, including aluminum, from impure manganese nitrate solution.

In the treatment of the crude manganese nitrate solution to remove impurities if the pH is less than about 4.0 all of the metal impurities present will not precipitate. If the pH is above about 5.0 no significant additional impurities precipitate and the adjustment of the pH above 5.0 is therefore economically impractical. The temperature should be maintained at least about 70° C. to flocculate and facilitate the removal of the precipitated impurities by filtration. Temperatures above about 100° C. provide no additional benefits and consequently are economically unattractive.

In the decomposition of the manganese nitrate solution, substantially free of impurities, a slurry of the nitrate solution and substantially pure manganese dioxide must be vigorously agitated and heated at a rate of heat input controlled to decompose the manganese nitrate and to form high purity pyrolusite crystals of manganese dioxide, nitrogen dioxide and water vapor. The rate of heat input should preferably be controlled to decompose the manganese nitrate and produce from about 2 pounds of $MnO_2$ product per gallon of slurry per day to about 5 pounds of $MnO_2$ product per gallon of slurry per day. For a properly treated solution the temperature normally associated with this rate of decomposition is between about 135° C. and about 146° C.

Decomposition rates below 2 pounds per gallon per day offer no technical problem but tend to be uneconomical from a production point of view. Above 5 pounds per gallon per day there is an increasing difficulty in (1) maintaining heat transfer without scaling, (2) disengaging the $NO_2$ and water vapor from the slurry without foaming problems and (3) maintaining a desirable manganese dioxide crystal size. Decomposition rates in excess of about 10 pounds per gallon per day are considered to be impractical.

The rate of decomposition of the manganese nitrate is controlled by the rate of heat transfer through the heat exchange surfaces not by the decomposition temperature.

| Item | Properly treated feed solution | Improperly treated feed solution |
|---|---|---|
| Decomposition temperature | 139–146° C. Variable with decomposition rate, stable conditions within range, smooth continuous decomposition. | 145–158° C. Unstable conditions. Decomposition will initiate at high temperature, the temperature will then fall. When temperature approaches lower range decomposition will again cease, and the cycle will repeat. |
| Product | Well defined "sugary" crystals about 80% plus 200 mesh. Very easy to separate from full strength mother liquor. | Very fine particles, low degree of crystallinity. Over 95% less than 300 mesh. Very difficult to separate from mother liquor. |
| Commercial feasibility | Practical | Impractical. |

The decomposition temperature can vary due to slight changes in impurities as well as the character of the solid phase. The practical control of rate is therefore accomplished by controlling the differential temperature across the heat exchange interface.

The conditions of this invention specified for decomposition of manganese nitrate are based on the simple and logical principal that the decomposition reaction should be carried out under conditions as near to equilibrium as possible. The generalized conditions which tend to promote equilibrium in a two phase system of this type are well known and can be summarized as follows:

(A) good agitation to prevent high concentration and thermal gradients
(B) high solid to liquid interface area
(C) controlled and uniform heat exchange rate
(D) with respect to continuous processing, stable and uniform rates of feed input and product removal.

The characteristics of the decomposition of manganese nitrate solution have been thoroughly studied and it has been found that certain superficial similarities exist to a conventional crystallization system. The feature of particular interest here is a phenomena similar to super-saturation. In commercial crystallization equipment, advantage is taken of the super-saturation feature in that a controlled degree of super-saturation can be brought about in an incremental volume of solution as it is briefly exposed to a heat exchange surface without inducing immediate crystallization on the heat exchange surface itself. The super-saturated solution subsequently comes to equilibrium slowly in the body of the crystallizer by the growth of crystals under near-equilibrium conditions.

In the decomposition of manganese nitrate solution the concentration and temperature of the solution, if free blowing pyrolusite crystals having active, clean crystal surface are not desired, can be raised considerably above its equilibrium decomposition point. Contrary to the high decomposition temperatures indicated in the literature, decomposition in an equilibrium system occurs at about 137° C. and a smooth practical decomposition rate can be attained in the range of 138 to 142° C., indicating a small but significant degree of super-heating. In the absence of an equilibrium solid phase however decomposition may not begin until temperatures as high as 158 to 160° C. are reached. One decomposition has started and a solid manganese dioxide phase has been developed the system is capable of quickly adjusting back to a normal decomposition temperature.

It is evident that from an operational point of view, the super-heating of the magnanese nitrate solution at about its equilibrium decomposition point is similar to the super-saturation in a conventional crystallization system, and an effort to carry out the decomposition under near-equilibrium conditions leads to the same type of operational features. Thus, a degree of super-heating of an increment of the manganese nitrate solution can occur upon a brief exposure to a heat exchange surface without immediate decomposition on the heat exchange surface, and the decomposition can be caused to occur subsequently in the body of an agitated system under near-equilibrium conditions.

To establish such a system it is necessary to (a) maintain a slurry of manganese dioxide crystals within the decomposing manganese nitrate solution, (b) maintain a high degree of slurry movement past the heat exchange surfaces and (c) control the rate of heat input so that the degree of super-heating is controlled within the metastable range of about 138° C. to about 160° C.

In addition to the above, two special restrictions should also be imposed which result from the particular characteristics of the manganese nitrate-manganese dioxide system. One of the restrictions which is important is that the heat exchange surfaces must be below the liquid level at all times. If the heat exchange surface extends above the slurry level a heavy scale will develop at, and just above, the solution line. A second control concerns the percent of solid manganese dioxide contained in the decomposing slurry. It has been found that high solid levels cause the generation of excessive fines due to the grinding action of one particle against another. In this respect it is desirable to maintain the percent solids at less than about 25 percent.

Decomposition system equipment suggested by the above criteria comprise a simple vessel, either jacketed or equipped with a heating coil and provided with an agitator. It must have a top enclosure to control the evolved $NO_2$, and the heat exchange surface must be below the normal liquid slurry level. Means must be provided for the addition of new manganese nitrate feed solution, removing product and venting the gases from the tank. In order to effect a uniform and high speed sweep of slurry past the heat exchange surfaces a jacketed tank is preferred over the use of coils.

Impurities contained in the crude manganese nitrate solution are removed by pH adjustment heating and filtration. Although this step removes the bulk of the impurities, such as silica, alumina, phosphorous, heavy metals, iron and the like, any alkali or alkaline earth oxides initially present will remain in the manganese nitrate solution as soluble nitrates. It has been found that relatively high percentages of potassium nitrate do not interfere with the decomposition of manganese nitrate nor with the reagent purity of the manganese dioxide product. The weight ratio of potassium to manganese ions in the decomposition system can be permitted to go as high as about 1 to 1 before the viscosity of the solution begins to interfere with the release of the $NO_2$ gas and water vapor. In the normal operation of the process the potassium would be controlled in the decomposition system at about one part of potassium to 1 to 3 parts of manganese by a simple bleed out of the mother liquor. It is evident that the removal of manganese from bleed out under these conditions is about 10 percent of the manganese in the solution. It should also be noted that the bleed out solution has reclaim value by any one of several known methods and is of value directly as a fertilizer.

The purity of the product has been pointed out to be reagent quality and results of chemical analyses are shown in Example 2 below. The exceptional quality of the product is clearly the result of the near-equilibrium conditions under which it is generated. The well defined, free flowing uniform and inclusion-free manganese dioxide crystals of pyrolusite structure which are formed not only reflect the exceptional purity of the product but greatly facilitate the mechanical operations of filtration and washing which are involved in separating the product from the mother liquor.

In order that those skilled in the art may more completely understand the present invention and the manner in which it may be carried into effect, the following specific examples are presented.

EXAMPLE 1

A 1,000 gallon capacity steam-jacketed tank equipped with a stirrer was filled with crude manganese nitrate solution obtained from leaching low grade manganese bearing ore. The solution was heated to about 90° C. and the pH adjusted to about 4.8 to 5.0 by the slow addition of manganous oxide obtained from reduced manganese dioxide-containing ore. The solution was continuously agitated by stirring during the heating and pH adjustment and after about one hour was filtered on a precoated drum filter and the precipitate spray washed.

The above treatment was carried out batchwise but may be performed continuously with the same resulting product obtained.

The treated manganese nitrate solution was then concentrated to about 55 percent by weight of manganese nitrate prior to decomposition, as such concentration is preferred for practical and economical decomposition of said solution.

Average results of chemical analysis of the dilute purified manganese nitrate solution during a six week period of operation were:

| | | |
|---|---|---|
| Mn | gms./l | 130.0 |
| K | gms./l | 5.5 |
| Fe | p.p.m. | 0.9 |
| Cu | p.p.m. | 0.6 |
| Cr | p.p.m. | 1.0 |
| Al | p.p.m. | 2.0 |
| Zn | p.p.m. | 7.0 |
| Ni | p.p.m. | 5.6 |
| Co | p.p.m. | 13.0 |
| Mg | p.p.m. | 9.0 |

EXAMPLE 2

The data shown in this example was also obtained during a six week period of continuous operation of a decomposition system for manganese nitrate utilizing a pilot plant decomposition unit.

At the startup of the unit a manganese nitrate solution representative of the purified concentrated solution of Example 1 above was introduced into a tank having a six foot six inch diameter and a height of eight feet provided with a high pressure steam jacket over the lower five feet of the sidewall. The jacket provided 98.7 ft.$^2$ of heat exchange surface. The top of the tank was substantially enclosed with the exception of openings for an agitator shaft, introducing the feed solution, withdrawing gases and removing the manganese dioxide product. A double turbine agitator provided with a 10 H.P. motor was arranged in the tank. Manganese dioxide solid product was added to the solution to provide a 1700 gallon slurry in which the solid manganese dioxide content was about 5.0 percent by weight. The slurry was agitated and the temperature maintained at about 140° C. to about 146° C. The decomposition system was then operated continuously by feeding the concentrated manganese nitrate solution from Example 1 at a rate which provided 1700±200 gallons of slurry in which the manganese dioxide solid content was maintained at from 5 to 20 percent by weight of the slurry during decomposition. Continuous operation in this manner was predetermined to provide from 3500 to about 5500 pounds per day of manganese dioxide product. The decomposition temperature was continuously maintained at about 140° C. to about 146° C. Objectionable quantities of foam formed periodically at the surface of the slurry and a silicone type defoaming agent was added to control the objectionable foam. The nitrogen dioxide gas and water vapor formed in the upper portion of the tank were conducted from the tank. The manganese dioxide product was continuously removed from the tank and substantially all the mother liquor was returned to the decomposition tank without dilution. The weight ratio of potassium ion to manganese ion in the treated manganese nitrate feed solution was 1:28 and in the mother liquor was maintained at 1:2 to 1:3, by bleeding from the system the required amount of mother liquor to maintain said ratio. The manganese dioxide product removed from the decomposition tank was dried by heating at about 110° C. to about 150° C. and consisted of well defined free flowing uniform and inclusion-free manganese dioxide high purity crystals of pyrolusite structure.

To illustrate the high purity of the manganese dioxide product obtained by the process of this invention a comparison of the analysis of the initial ore introduced into the process and an average chemical analysis of the product obtained during the period of operation of the decomposition system in Example 2 are presented below.

AVERAGE OF PRODUCT ANALYSES

| | Percent by weight |
|---|---|
| Mn | 63.0 (MnO$_2$—>99.5). |
| Fe | 0.03. |
| Al | 0.007. |
| Zn | 0.0001. |
| Cu | 0.0015. |
| Cr | 0.006. |
| Ni | 0.0025. |
| SO$_4$ | 0.05. |
| Insols | 0.02. |
| Co | 0.007. |
| Alkali and Alkaline earth metals (as sulfates) | 0.15. |
| NO$_3$ | Less than 0.05. |
| As | Not detected. |
| P | 0.004. |

ANALYSIS OF INITIAL ORE FEED, AVERAGE VALUE, DRY BASIS

| | Percent by weight |
|---|---|
| Mn | 46.4 |
| Fe | 6.3 |
| Al$_2$O$_3$ | 5.9 |
| SiO$_2$ | 4.0 |
| K$_2$O | 2.0 |
| As | 0.2 |
| P | 0.08 |
| Ni | 0.07 |
| Zn | 0.06 |
| Co | 0.05 |
| Cu | 0.03 |
| S | 0.02 |

Although this invention has been described with reference to certain specific and presently preferred embodiments thereof it is not limited to such described embodiments since alterations and modifications may be made therein which are within the full intended scope of this invention as defined by the appended claims.

I claim:

1. A process for recovering high purity free flowing pyrolusite crystals of manganese dioxide from crude manganese nitrate solutions comprising the steps of:
   (a) adjusting the pH of the manganese nitrate solution to from about 4.0 to about 5:5;
   (b) heating the solution of step (a) at a temperature from about 70° C. to about 105° C. and filtering the solution;
   (c) combining the solution of step (b) with pure manganese dioxide to form a slurry;
   (d) vigorously agitating and heating the slurry at a rate of heat input controlled to decompose the manganese nitrate solution and provide free-flowing high purity pyrolusite crystals of manganese dioxide, nitrogen dioxide and water vapor and
   (e) recovering the manganese dioxide product.

2. The process of claim 1 wherein the decomposition of manganese nitrate solution is controlled at a rate to provide less than about 10 pounds of manganese dioxide per gallon of slurry per day.

3. The process of claim 2 wherein the rate is controlled to provide from about 2 to about 5 pounds of manganese dioxide per gallon of slurry per day.

4. The process of claim 1 wherein the pH of the manganese nitrate solution is adjusted to form about 4.5 to about 5.0.

5. The process of claim 1 wherein the solution of step (b) is heated at a temperature of from about 90° C. to about 100° C.

6. The process of claim 1 wherein a foam depressant is added to the agitated and heated slurry.

7. The proces of claim 1 wherein sufficient managanese dioxide is combined with the manganese nitrate solution to form a slurry having a solids content of about 5% to about 25% by weight.

8. The process of claim 1 wherein the filtered solution is concentrated to about 50% by weight of manganese nitrate prior to decomposition.

9. The process of claim 1 wherein step (c) is performed only initially at start-up of the process, the solution from step (b) is continuously introduced to the agitated and heated slurry of step (d), and all other steps are carried out continuously.

10. The process of claim 1 wherein the temperature of the slurry in step (d) ranges from about 135° C. to about 146° C.

References Cited

UNITED STATES PATENTS

| | | | |
|---|---|---|---|
| 1,287,041 | 12/1918 | Kaplan | 423—605 |
| 1,293,461 | 2/1919 | Kaplan | 423—605 |
| 1,761,133 | 6/1930 | Laury | 423—50 |
| 2,374,674 | 5/1945 | Fox et al. | 423—605 |
| 2,681,268 | 6/1954 | Nossen | 423—50 |
| 2,737,441 | 3/1956 | Nossen | 75—121 X |
| 2,779,659 | 1/1957 | Koslov | 423—50 |
| 2,793,112 | 5/1957 | Mancke | 423—50 |
| 3,677,700 | 7/1972 | Fraser | 423—50 |

FOREIGN PATENTS

| | | | |
|---|---|---|---|
| 1,153,005 | 8/1963 | Germany | 423—50 |

OTHER REFERENCES

Fox et al.; "Bureau of Mines, Technical Paper 674," 1945.

HERBERT T. CARTER, Primary Examiner

U.S. Cl. X.R.

423—605, 50